(12) United States Patent
Haswell

(10) Patent No.: US 7,254,671 B2
(45) Date of Patent: Aug. 7, 2007

(54) FILE SYSTEM LAYOUT AND METHOD OF ACCESS FOR STREAMING MEDIA APPLICATIONS

(75) Inventor: Jonathan M. Haswell, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 466 days.

(21) Appl. No.: 10/875,026

(22) Filed: Jun. 23, 2004

(65) Prior Publication Data

US 2005/0286149 A1    Dec. 29, 2005

(51) Int. Cl.
*G06F 12/00* (2006.01)
(52) U.S. Cl. .................. 711/112; 711/4; 711/170; 711/171
(58) Field of Classification Search .......... 711/4, 711/111, 114, 170, 171, 173
See application file for complete search history.

(56) References Cited

U.S. PATENT DOCUMENTS 6,108,695 A    8/2000  Chawla
6,643,654 B1   11/2003 Patel et al.
2002/0089530 A1  7/2002 Markel

FOREIGN PATENT DOCUMENTS

JP      10027852 A    1/1998
WO      0177880 A2   10/2001

OTHER PUBLICATIONS

D.P. Anderson et al., "A File System For Continuous Media," ACM Transactions on Computer Systems, vol. 10, No. 4, Nov. 1992, pp. 311-337.

*Primary Examiner*—Jack A. Lane
(74) *Attorney, Agent, or Firm*—Joseph P. Curtin, L.L.C.

(57) ABSTRACT

A file system for streaming media uses at least one set of a plurality of storage bands that are arranged sequentially on a magnetic storage disk. Each storage band contains a plurality of storage blocks. At least one data file that is formed from a plurality of sequential data blocks and contains, for example, media content and/or video data is stored in a set of storage bands so that each data block of the data file is stored in a sequential manner with respect to consecutively sequential data blocks. The plurality of storage blocks contained in each storage band are sequentially arranged in the storage band and the storage blocks contained in each storage band sequentially store data blocks of the data file.

26 Claims, 5 Drawing Sheets

FILE SYSTEM LAYOUT AND METHOD OF ACCESS FOR STREAMING MEDIA APPLICATIONS

BACKGROUND OF THE INVENTION

1. Field of the Invention

The present invention relates to disk drives. More particularly, the present invention relates to a system and a method for streaming at least one content stream having a reduced access time for each content stream.

2. Description of the Related Art

An increasing number of disk-based storage systems are used for streaming content, in particular, video data. In such an environment, it is critical that the streams be maintained without any delays that would distort a delivered image. To do this, streaming-content disk drives are usually customized to have slower, more reliable servo systems in order to reduce seek errors. Additionally, the lowest possible RPM spindle speed is used in order to minimize acoustic problems and in order to provide the highest reliability possible for rugged environments in which such systems can be placed.

Many disk-based streaming-content storage systems stream multiple streams simultaneously. Accordingly, it is important for the hardware of such systems to provide the maximum performance in terms of the number of content streams that can be produced. A factor for providing maximum performance in terms of the number of content streams is the reducing the time for accessing a block of data in a disk-based streaming-content storage system. The time to access a block of data in a disk drive is includes the seek latency, the rotation latency for the data to arrive under the disk head, and the data transfer time.

The data in disk-based streaming content systems is typically read or written in data blocks of 128 KB or similarly sized blocks. Using the access times for an exemplary 5400 RPM Seagate Barracuda disk drive and data blocks of 128 KB, the worst-case total access time to read or write a video data block that has been randomly allocated on the Barracuda disk drive is the sum of the worst-case seek latency of 20 ms, the worst-case rotation latency of 11 ms and a data transfer time of 2 ms for a total worst-case access time of 33 ms. When the exemplary Barracuda disk drive is capable of out-of-order read, then worst-case total access time becomes the sum of the worst-case seek latency of 20 ms, the worst-case rotation latency of 11 ms and a data transfer of 0 ms (the data transfer occurs during the rotation latency) for a total worst-case access time of 31 ms. In either scenario, greater than 60% of the access time is caused by the seek latency.

Consequently, what is needed is a technique for reducing the time to access a block of data in a disk-based streaming-content storage system.

BRIEF SUMMARY OF THE INVENTION

The present invention provides a technique for reducing the time to access a block of data in a disk-based streaming-content storage system. In particular, the present invention provides a file system that reduces the worst-case seek latency for a disk-based streaming-content storage system by providing a filing system having a special data layout. Additionally, the present invention provides a data access control technique that maximizes the effect of the special data layout of the present invention.

The advantages of the present invention are provided by a file system having at least one set of a plurality of storage bands that are arranged sequentially on a disk of a disk drive. Each storage band contains at least one track and each track contains at least one storage block. At least one data file that is formed from a plurality of sequential data blocks is stored in a set of storage bands so that each data block of the data file is stored in a sequential manner with respect to consecutively sequential data blocks. The data file can contain, for example, media content and/or video data and/or data that are accessed substantially sequentially. Each storage block can be the same size as a data block. Alternatively, a plurality of storage blocks could be the same size as a data block. Moreover, each track can contain a single storage block.

In one exemplary embodiment of the present invention, the plurality of storage blocks contained in each storage band are sequentially arranged in the storage band, and the storage blocks contained in each storage band sequentially store data blocks of the data file. In another exemplary embodiment, each data block is stored in a storage band that is adjacent to a storage band that stores a consecutively sequential data block of the file. In yet another exemplary embodiment, the sequential arrangement of the storage bands of the set of storage bands is between a first and a last storage band. Data blocks of the data file are stored sequentially across the storage bands of the set of storage bands with a data block of the data file being stored in a storage band that is adjacent to a storage band that stores a consecutively sequential data block when the storage band is not one of the first and last storage bands and with two consecutive data blocks of the data file being stored in a storage band when the storage band is one of the first and last storage bands.

The present invention also provides a method of storing streaming content data in which at least one set of a plurality of storage bands is arranged sequentially within a file system. At least one data file that is formed from a plurality of sequential data blocks is stored in the file system so that each data block of the data file is stored in a sequential manner with respect to consecutively sequential data blocks. The data file can contain, for example, media content, video data and/or data that are accessed substantially sequentially. A plurality of storage blocks is arranged sequentially within each storage band. Data blocks of the data file are stored sequentially in the storage blocks of each storage band. Each data block is stored in a storage band that is adjacent to a storage band that stores a consecutively sequential data block of the file. Alternatively, each storage band contains at least one track and each track contains at least one storage block. In one exemplary embodiment, each track contains one storage block.

In one exemplary embodiment, the sequential arrangement of the storage bands of the set of storage bands is between a first and a last storage band. In one exemplary embodiment, data blocks of the data file are stored sequentially across the storage bands of the set of storage bands with a data block of the data file being stored in a storage band that is adjacent to a storage band that stores a consecutively sequential data block when the storage band is not one of the first and last storage bands and with two consecutive data blocks of the data file being stored in a storage band when the storage band is one of the first and last storage bands. In another exemplary embodiment, data blocks of the data file are stored sequentially across the storage bands of the set of storage bands with a data block of the data file being stored in a storage band that is adjacent to a storage band that stores a consecutively sequential data block. In yet another exemplary embodiment, data blocks of the data file are stored sequentially across the storage bands of the set of storage bands with a data block of the data file being sequentially stored in each storage band from the first storage band to the last storage band, and no data blocks are stored sequentially between the last storage band to the first storage band.

The present invention also provides a method of generating streaming content in which a file system is provided having at least one set of a plurality of storage bands that are arranged sequentially on a disk of a disk drive, each storage band containing a plurality of storage blocks. At least one data file that is formed from a plurality of sequential data blocks is stored in a set of storage bands so that each data block of the data file is stored in a sequential manner with respect to consecutively sequential data blocks. The data blocks of the data file are accessed in their sequential order, such as by moving a disk head of the disk drive sequentially across the set of the plurality of storage bands and reading each respective data block of the data file in sequence. Each data block is stored in a storage band that is adjacent to a storage band that stores a consecutively sequential data block of the file. The sequential arrangement of the storage bands of the set of storage bands is between a first and a last storage band. In one exemplary embodiment of the present invention, data blocks of the data file are stored sequentially across the storage bands of the set of storage bands with a data block of the data file being stored in a storage band that is adjacent to a storage band that stores a consecutively sequential data block when the storage band is not one of the first and last storage bands and with two consecutive data blocks of the data file being stored in a storage band when the storage band is one of the first and last storage bands. In another exemplary embodiment, data blocks of the data file are stored sequentially across the storage bands of the set of storage bands with a data block of the data file being stored in a storage band that is adjacent to a storage band that stores a consecutively sequential data block. In still another exemplary embodiment, data blocks of the data file are stored sequentially across the storage bands of the set of storage bands with a data block of the data file being sequentially stored in each storage band from the first storage band to the last storage band, and no data blocks are stored sequentially between the last storage band to the first storage band. Alternatively, each storage band contains at least one track and each track contains at least one storage block. In one exemplary embodiment, each track contains one storage block.

The present invention also provides a device having at least one disk having at least set of a plurality of storage bands that are arranged sequentially on the disk. Each storage band contains at least one data track and each data track contains at least one storage block. At least one data file that is formed from a plurality of sequential data blocks is stored in a set of storage bands so that each data block of the data file is stored in a sequential manner with respect to consecutively sequential data blocks. The plurality of storage blocks contained in each storage band are sequentially arranged in the storage band, and the storage blocks contained in each storage band sequentially store data blocks of the data file. Alternatively, each data block is stored in a storage band that is adjacent to a storage band that stores a consecutively sequential data block of the file.

The sequential arrangement of the storage bands of the set of storage bands is between a first and a last storage band. In one exemplary embodiment, data blocks of the data file are stored sequentially across the storage bands of the set of storage bands with a data block of the data file being stored in a storage band that is adjacent to a storage band that stores a consecutively sequential data block when the storage band is not one of the first and last storage bands and with two consecutive data blocks of the data file being stored in a storage band when the storage band is one of the first and last storage bands. In another exemplary embodiment, data blocks of the data file are stored sequentially across the storage bands of the set of storage bands with a data block of the data file being stored in a storage band that is adjacent to a storage band that stores a consecutively sequential data block. In yet another exemplary embodiment, data blocks of the data file are stored sequentially across the storage bands of the set of storage bands with a data block of the data file being sequentially stored in each storage band from the first storage band to the last storage band, and no data blocks are stored sequentially between the last storage band to the first storage band. In an alternative embodiment, each track can contain a single storage block.

BRIEF DESCRIPTION OF THE DRAWINGS

The present invention is illustrated by way of example and not by limitation in the accompanying figures in which like reference numerals indicate similar elements and in which.

DETAILED DESCRIPTION OF THE INVENTION

The present invention provides a file system having a special data layout that reduces the worst-case seek latency for a disk-based streaming-content storage system by at least 50% depending on the particular seek-curve characteristics for a disk drive. Seek latency is not linearly related to seek length and varies from disk drive to disk drive based on the seek-curve characteristics of the disk drive. The present invention reduces the seek length for accessing a block of content by greater than 50% over conventional file systems. It should be understood that the exact reduction in seek time provided by the present invention depends on the particular seek-curve characteristics for the disk drive. Additionally, the present invention provides a data access control technique that maximizes the effect of the special data layout of the present invention.

Accordingly, the present invention significantly improves the number of video streams that a disk drive or multiple disk drives can support while maintaining the guaranteed data rates that are required for video streaming. Further, the data access control technique of the present invention supports "trick" modes required by video applications, such as fast-forward and rewind.

According to the present invention, the seek latency is reduced by using a file system that divides a disk of a disk-based streaming-content storage system into at least one set of storage bands. The exact number storage band sets and storage bands in a set are selected based on the characteristics of the disk drive and the desired system characteristic. Typically, three to seven storage bands would be selected to be in each set. It should be understood, though, that the total number of bands is limited by the time the system is required to start reading or writing an additional file, that is, the time needed to get to any particular band. When this requirement is relaxed, then the greater the number of bands that are contained in each band set results in a correspondingly shorter seek time.

Figure 1:
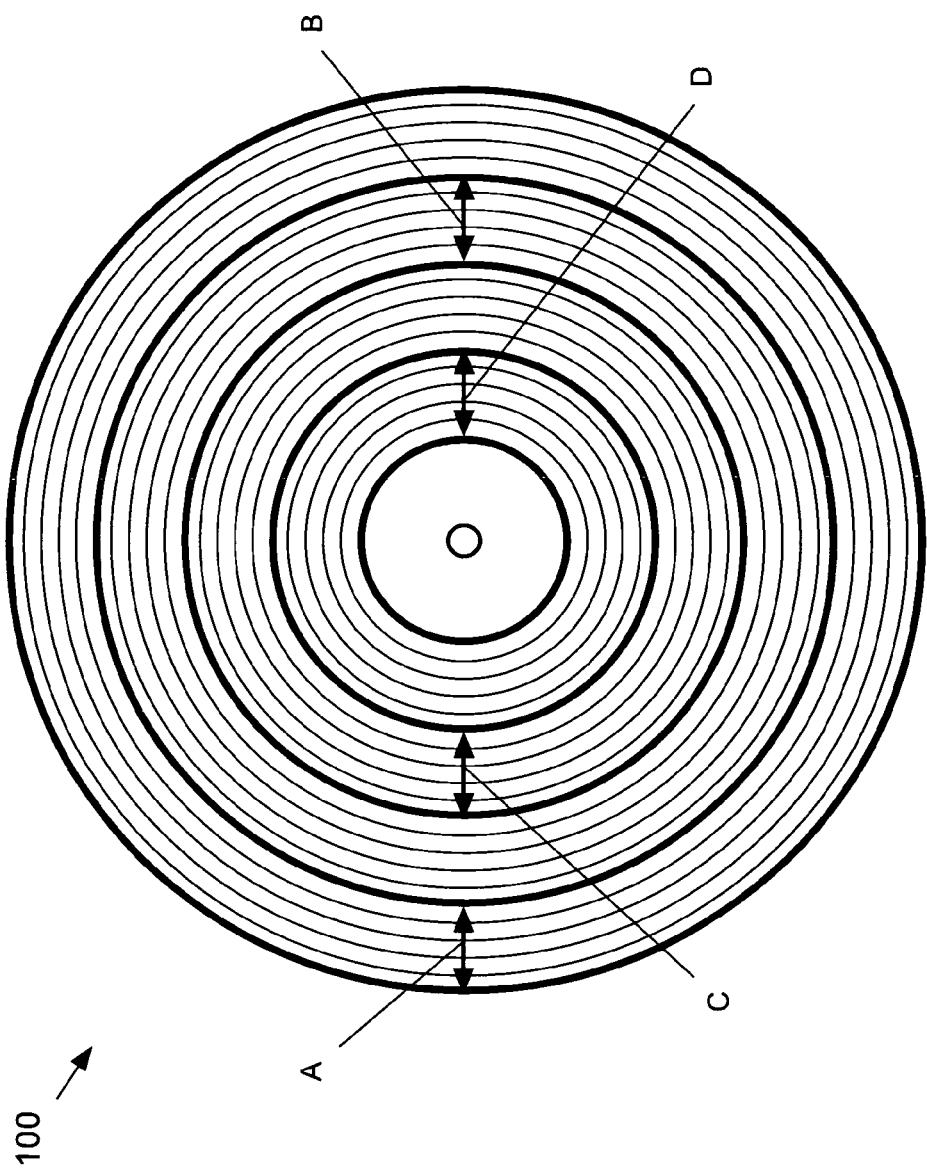
FIG. 1 shows an exemplary disk of a disk drive that has been divided into one set of four bands according to the present invention.

FIG. 1 shows an exemplary disk 100 of a disk drive that has been divided into one set of four storage bands A-D according to the present invention. Storage bands A-D are arranged sequentially starting from one end, or the edge, of disk 100. Each storage band A-D contains about the same number of blocks. The concentric circles within each storage band depict the tracks on which the blocks are formed. The present invention can be used with conventionally sized blocks of 128 KB. Alternatively, the present invention can be used with blocks of any size. The blocks in each storage band are utilized in a sequentially adjacent manner.

Figure 2:
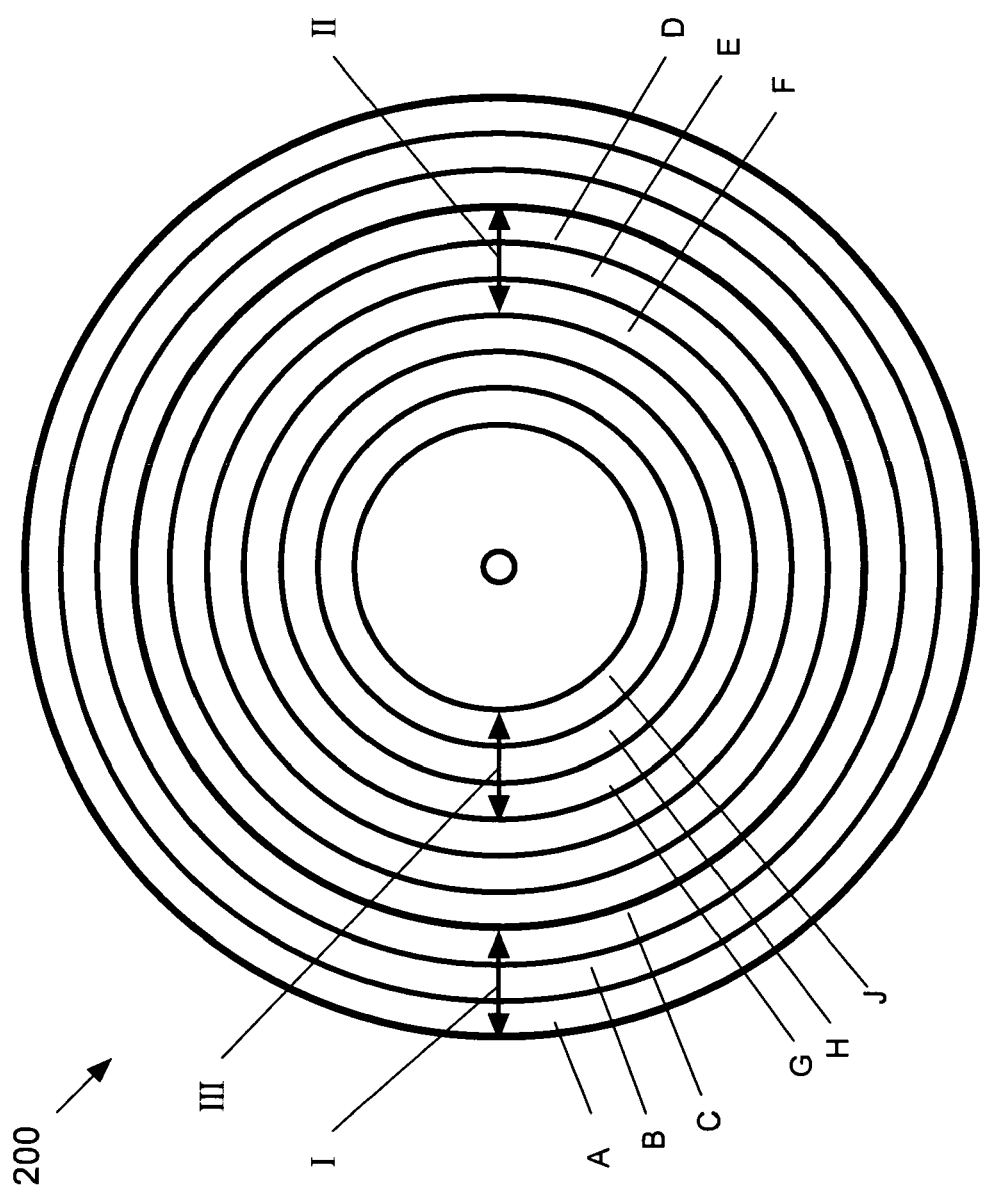
FIG. 2 shows an exemplary disk of a disk drive that has been divided into three sets of three bands in each set according to the present invention.

It should be understood that a disk could be divided into a plurality of sets of storage bands. For example, FIG. 2 shows an exemplary disk 200 of a disk drive that has been divided into three sets I-III of three storage bands each according to the present invention. Specifically, storage band set I, depicted using shading, includes storage bands A-C. Storage band set II, depicted as having no shading, includes storage bands D-F. Storage band set III, depicted using shading, includes storage bands G, H and J.

Figure 3:
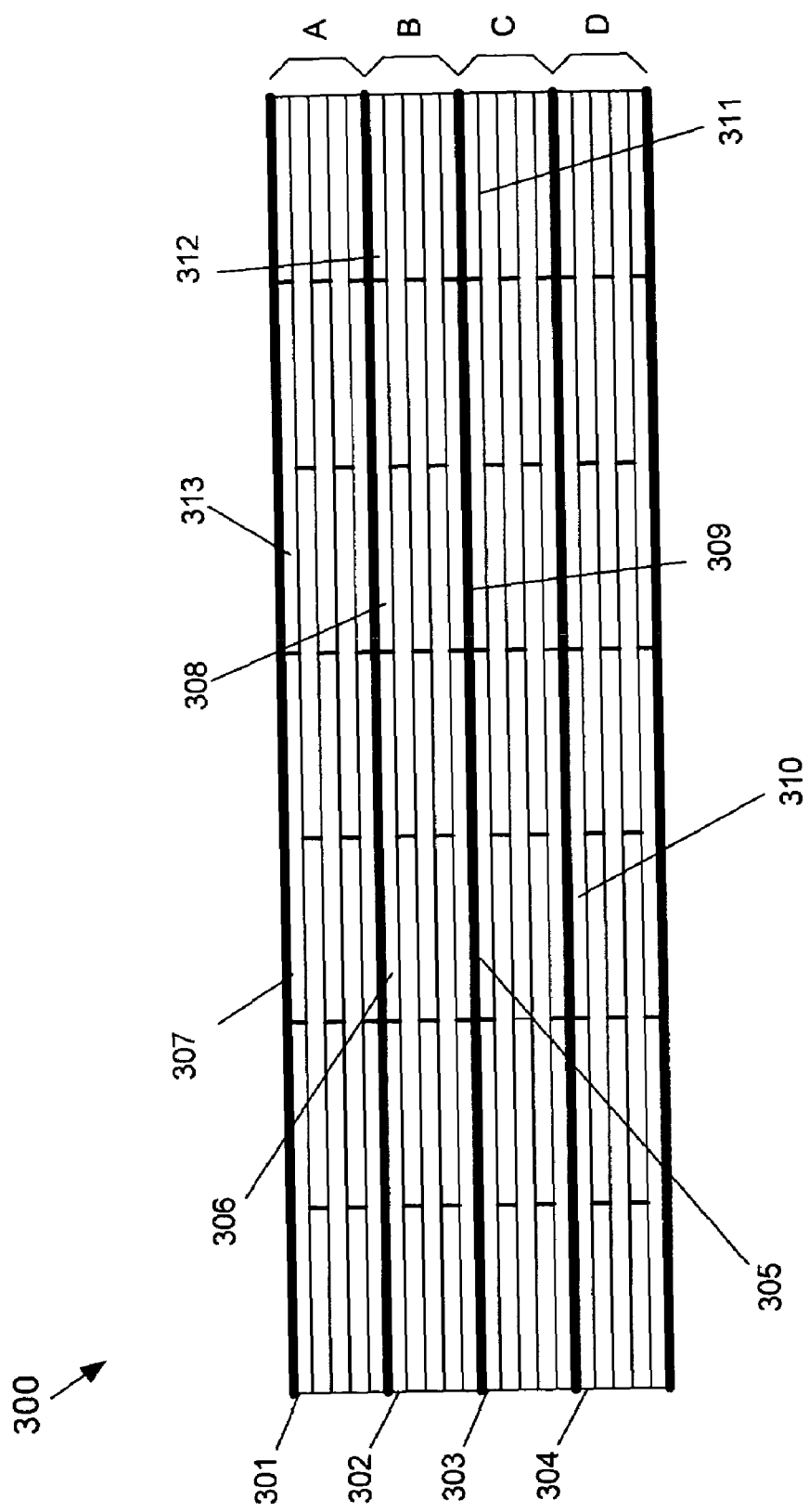
FIG. 3 depicts one exemplary embodiment of writing blocks of data across the bands of a set of bands according to the present invention.

When a file is written into the filing system, the write starts in a band, typically the first band of a set of storage bands, where the first block of the file is written. The blocks of the file are written sequentially, one block per band, in a snaking manner across the storage bands of the set. FIG. 3 depicts one exemplary embodiment of writing blocks of data across the storage bands of a set of bands according to the present invention. In particular, FIG. 3 depicts a linearized portion of a disk 300 having one set of four storage bands A-D that are initially empty, that is, all blocks in storage bands A-D are available for storing data. A first block of the file is written into the first available location, or storage block, 301 in band A. A second block of the file is written in location 302 in band B. A third block is written into location 303 in band D. A fourth block is written into location 304 in band D. A fifth block is written into location 305 in band C. A sixth block is written into location 306 in band B. A seventh block is written into location 307 in band A. An eighth block is written into location 308 in band B. A ninth block is written into location 309 in band C. A tenth block is written into location 310 in band D. An eleventh block is written into location 311 in band C. A twelfth block is written into location 312 in band B. A thirteenth block is written into location 313 in band A.

The writing process continues so that the data is written in a snaking manner across storage bands A-D. Because disk 300 has four storage bands for this example, the longest seek length (and indirectly, seek time) required for a disk head to move from one block (in one band) to the next block (in the next band) in the file, in either the forward or reverse direction is guaranteed to be at most one-half of the maximum seek length in the file. The average seek length taken over any two adjacent seeks is one-fourth of the maximum seek length of the disk drive.

Figure 4:
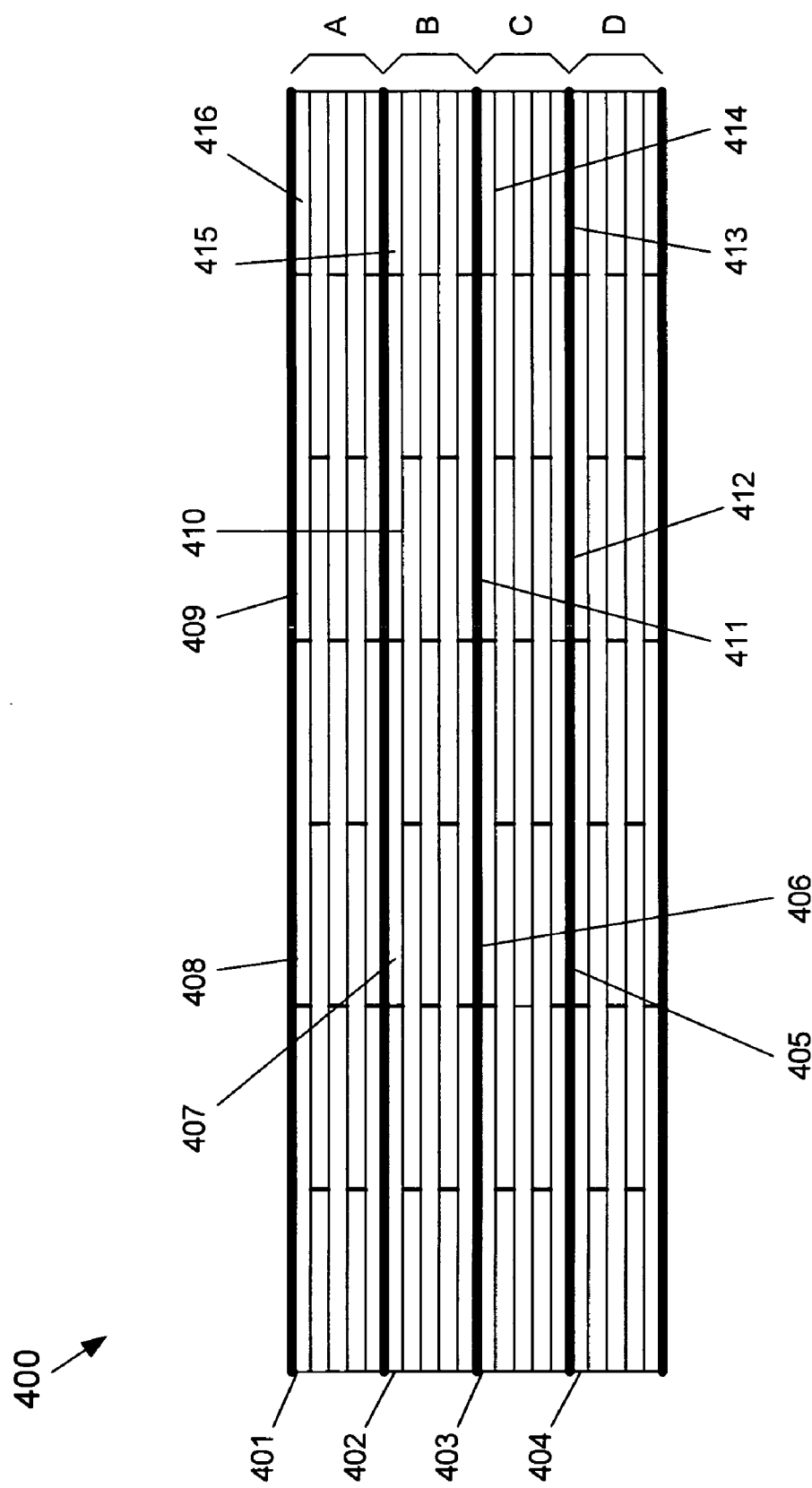
FIG. 4 depicts another exemplary embodiment of writing blocks of data across the bands of a set of bands according to the present invention.

FIG. 4 depicts another exemplary embodiment of writing blocks of data across the storage bands of a set of bands according to the present invention. In particular, FIG. 4 depicts a linearized portion of a disk 400 having one set of four storage bands A-D that are initially empty, that is, all blocks in storage bands A-D are available for storing data. A first block of the file is written into the first available location, or storage block, 401 in band A. A second block of the file is written in location 402 in band B. A third block is written into location 403 in band C. A fourth block is written into location 404 in band D. A fifth block is written into location 405 in band D. A sixth block is written into location 406 in band C. A seventh block is written into location 407 in band B. An eighth block is written into location 408 in band A. A ninth block is written into location 409 in band A. A tenth block is written into location 410 in band B. An eleventh block is written into location 411 in band C. A twelfth block is written into location 412 in band D. A thirteenth block is written into location 413 in band D. A fourteenth block is written into location 414 in band C. A fifteenth block is written into location 415 in band B. A sixteenth block is written into location 416 in band A.

As video files are very large, each file will consist of thousand, if not millions, of data blocks. Using the exemplary data layout depicted in FIG. 4, each storage band fills evenly as the file is written. Accordingly, when the filing system for a set of storage bands is defined to be full when any one particular band of the set of storage bands becomes full, there will be no significant waste of space because each band is the same size, or about the same size, and each band of the storage band set will contain virtually the same amount of data.

Figure 5:
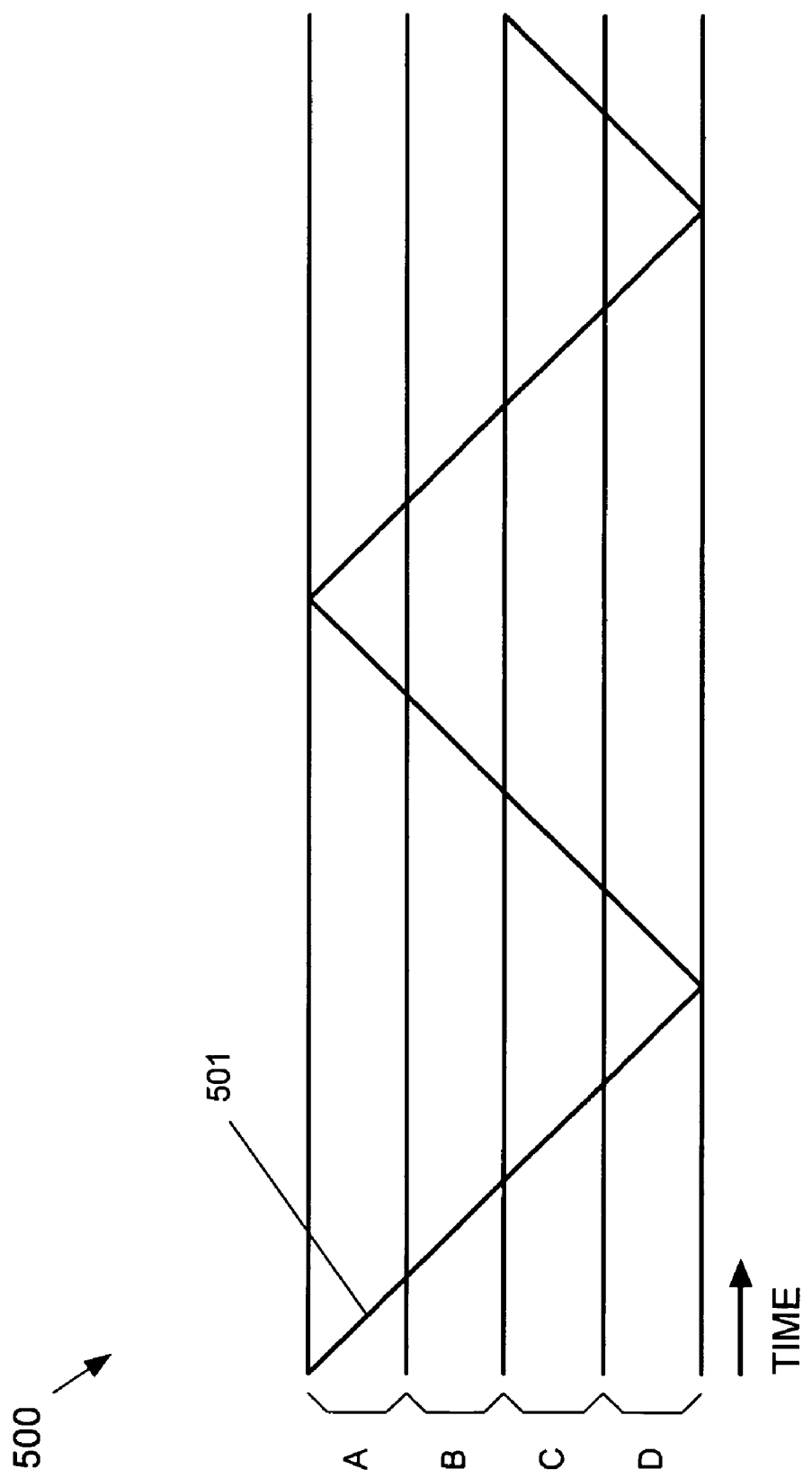
FIG. 5 depicts exemplary motion of a disk head as a function of time across a portion of a disk having one set of four bands according to the present invention.

To access data in a single file stored in the file system of the present invention, for both reading and writing, the disk head moves across the storage bands in a snaking-like or serpentine-like manner reading or writing the data sequentially so that each seek is an average of one-fourth of the maximum seek length for the disk drive. FIG. 5 depicts exemplary motion of a disk head as a function of time across a portion of a disk 500 having one set of four storage bands A-D according to the present invention. The motion 501 of the disk head traces a path that snakes sequentially across storage bands A-D starting with band A, crossing bands B and C, and ending with band D before returning to band A by crossing bands C and B. The snaking pattern of the disk head repeats when the disk head arrives at band A.

When there is a request to access a second file to generate a second content stream while the disk head is generating a first content stream, the request to the disk drive is delayed until the snaking pattern of the disk head caused when accessing the first file places the head both in the band containing the first block for the second file and moving in the correct direction to access the second block of the second file. For example, consider the situation in which two files are stored in a filing system having four storage bands, such as the filing system depicted in FIG. 5. Assume that the blocks of the first file are stored sequentially across storage bands A-D in a snaking pattern according to the present invention. Assume also that the first block of the second file is stored in band B and subsequent blocks are sequentially arranged across storage bands A-D in a snaking pattern, with the second block of the second file being stored in band C.

Now consider that the disk head is reading data for the first file that is stored in band D and a request is made to read a second file, the issuing of the read command to the disk drive for the first block of the second file is delayed until the blocks for the first file have been sequentially read from bands D, C, B, A and B. After reading the block for the first file that was stored in band B, the disk head is within one-fourth of a seek length of the first required block for the second file. The first block of the second file is then accessed. Subsequently, the next required block for each of the first and second files are respectively accessed sequentially as the disk head moves across the bands in a snake-like manner. Thus, reads of the second file are interspersed with reads of the first file. Table 1 sets forth the read pattern for this exemplary situation.

TABLE 1

| BAND | READ OPERATION | COMMENT |
| --- | --- | --- |
| 504 | File 1 - block n | Read request for second file received. |
| 503 | File 1 - block n + 1 | |
| 502 | File 1 - block n + 2 | |
| 501 | File 1 - block n + 3 | |
| 502 | File 1 - block n + 4 | Read request for second file issued. |
| 502 | File 2 - block 0 | |
| 503 | File 1 - block n + 5 | |
| 503 | File 2 - block 1 | |
| 504 | File 1 - block n + 6 | |
| 504 | File 2 - block 2 | |
| 503 | File 1 - block n + 7 | |
| 503 | File 2 - block 3 | |

Regardless of the number of files that are being read (or written), the disk head moves across the bands, between the inner and outer bands, at a fixed frequency. Thus, the average angular velocity of the disk head is constant and depends on the rate in which a single file needs to be read, which, in turn, depends on the amount of data written into each respective band and the actual data rate of the media stream.

When a disk is divided into a single set of four storage bands, the present invention provides that while two (or more) different content streams are being read, at no time is a seek made that is greater than one-half the total seek length across the disk drive. The average of any two consecutive seeks is three-eights (3/8) of the maximum seek length for the disk drive. Further, when the read order that data is read is optimized within each band, that is, the disk head moves across a band reading data required by both files in the order that the head "finds" the data in the seek direction that the disk head is moving, the access time can be further reduced. When a file system having greater than four storage bands is used on a disk, the reduction in seek length becomes greater. Even further reductions in seek length can be obtained within a file system when a plurality of file systems are contained on a single disk.

The penalty paid for the seek time reduction provided by the present invention is a delay in the start of the streaming of data for a subsequently requested file. The delay, however, is in the sub-second region and would be unnoticeable to a viewer who may be used to much the longer delays that are associated with starting a DVD, a VCR or an in-flight entertainment system, which often have delays that are measured in the tens of seconds before video play begins.

To support trick modes, such as fast-forward and rewind, the present invention reads certain blocks in a file. For example, for a slow fast-forward, the present invention reads every Nth data block. As the disk head passes across the bands using a snaking-type motion at the standard rate, that is, the angular velocity of the head in order to properly read the file in a normal mode, the file is sampled, i.e., every Nth data block is read, to generate a fast-forwarded streaming content. Table 2 sets forth an exemplary read pattern for a fast-forward function according to the present invention.

TABLE 2

| BAND | READ OPERATION |
| --- | --- |
| 501 | File 1 - block n |
| 502 | File 1 - block n + 5 |
| 503 | File 1 - block n + 8 |
| 504 | File 1 - block n + 15 |
| 503 | File 1 - block n + 20 |

To provide a faster fast-forward, the present invention might read every 3×Nth data block. There may be some jitter in the image that is produced by the streaming content caused by the distance that is jumped forward in the file not being constant. When jitter is an issue, it is possible to change the overall operation so that after accessing, for example, a block in band 504 in FIG. 5, one long seek back to band 501 is performed, i.e., data is not accessed on the return motion of the disk head. While the overall efficiency of the system is reduced by this alternative configuration, an even faster forward function is provided. A rewind function can be provided be using the same sampling technique in reverse with the head of the disk moving in a snaking-type across the disk at the same constant rate.

MPEG streams are usually configured so that given "random" blocks of data; the controller can pick out the start of frames in the video stream and, hence, display a frame even without having the context of the previous frame. While it is also possible to construct MPEG streams in which it is difficult for a controller to pick out the start of a frame, but if the fast-forward and reverse functions are desired, MPEG formats that make such modes possible should be used.

When different video streams have different, but fixed, compression ratios, then in one exemplary embodiment of the present invention, the block size should be changed so that the same number of disk accesses per second are required for each video streams. Additionally, the present invention can accommodate a video stream having a variable rate compression ratio by using a varying number of blocks written in each band as the disk head passes over the band, that is, by writing whatever data needs to be written to a particular band at the time that the disk head snakes over the band. Accordingly, some bands may fill at different rates in comparison to other bands, but should over an extended operation be expected to average out so that the bands, in general, are uniformly filled.

Another exemplary embodiment of the present invention supports out-of-order reads so that as soon as the head seeks to a desired track, data can be immediately written or, if data has been requested, the data can be immediately read. When out-of-order read is not supported, the disk drive must wait until the first block of data passes under the head before reading can begin and so that all of the data blocks can be read in sequence. Further, the available bandwidth is increased by the present invention when a block size is selected to exactly equal the amount of data that will fit in a track in one revolution of the disk, thereby ensuring that when the head arrives at a target track, there will be data available for it to read/write and will have zero latency. For disk drives in which the amount of data stored on a track varies between the outside diameter (OD) and the inside diameter (ID) of the disk (as most modern disk drives do), then the filing system of the present invention determines the amount of data that will fit around a track at each radial position and write accordingly different sized blocks of data into each band to match the physical track size on the disk.

For disk drives and other storage systems that allow for, for example, n defective sectors in each track, the filing system of the present invention reduces the amount of data stored in each track in order to allow for n defective disk sectors per track. Accordingly, for disk drives and other storage systems that have defective sectors, the filing system of the present invention should not store video data on tracks having greater than a predetermined number of defective sectors, which will vary from system implementation to system implementation.

It should be understood that the present invention can be used with other mass storage devices, such as optical drives.

Although the foregoing invention has been described in some detail for purposes of clarity of understanding, it will be apparent that certain changes and modifications may be practiced that are within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A file system comprising at least one set of a plurality of storage bands that are arranged sequentially on a disk of a disk drive, each storage band comprising at least one track, each track comprising at least one storage block, and at least one data file that is formed from a plurality of sequential data blocks being stored in a set of storage bands so that each data block of the data file is stored in a sequential manner with respect to consecutively sequential data blocks.

2. The file system according to claim 1, wherein the plurality of storage blocks comprising each storage band are sequentially arranged in the storage band, and
    wherein the storage blocks comprising each storage band sequentially store data blocks of the data file.

3. The file system according to claim 1, wherein each data block is stored in a storage band that is adjacent to a storage band that stores a consecutively sequential data block of the file.

4. The file system according to claim 1, wherein the sequential arrangement of the storage bands of the set of storage bands is between a first and a last storage band,
    wherein data blocks of the data file are stored sequentially across the storage bands of the set of storage bands with a data block of the data file being stored in a storage band that is adjacent to a storage band that stores a consecutively sequential data block when the storage band is not one of the first and last storage bands and with two consecutive data blocks of the data file being stored in a storage band when the storage band is one of the first and last storage bands.

5. The file system according to claim 1, wherein the data file comprises media content.

6. The file system according to claim 1, wherein the data file comprises data that are accessed substantially sequentially.

7. A method of storing streaming content data, comprising:
    arranging at least one set of a plurality of storage bands sequentially within a file system; and
    storing at least one data file that is formed from a plurality of sequential data blocks in the file system so that each data block of the data file is stored in a sequential manner with respect to consecutively sequential data blocks.

8. The method according to claim 7, further comprising:
    arranging a plurality of storage blocks sequentially within each storage band; and
    storing data blocks of the data file sequentially in the storage blocks of each storage band.

9. The method according to claim 7, wherein the sequential arrangement of the storage bands of the set of storage bands is between a first and a last storage band,
    the method further comprising storing data blocks of the data file sequentially across the storage bands of the set of storage bands with a data block of the data file being stored in a storage band that is adjacent to a storage band that stores a consecutively sequential data block when the storage band is not one of the first and last storage bands and with two consecutive data blocks of the data file being stored in a storage band when the storage band is one of the first and last storage bands.

10. The method according to claim 7, wherein the sequential arrangement of the storage bands of the set of storage bands is between a first and a last storage band,
    the method further comprising storing data blocks of the data file sequentially across the storage bands of the set of storage bands with a data block of the data file being stored in a storage band that is adjacent to a storage band that stores a consecutively sequential data block.

11. The method according to claim 7, wherein the sequential arrangement of the storage bands of the set of storage bands is between a first and a last storage band,
    the method further comprising:
    storing data blocks of the data file sequentially across the storage bands of the set of storage bands with a data block of the data file being sequentially stored in each storage band from the first storage band to the last storage band; and
    storing no data blocks sequentially between the last storage band to the first storage band.

12. The method according to claim 7, wherein the data file comprises media content.

13. A method of generating streaming content, comprising:
    providing a file system comprising at least one set of a plurality of storage bands that are arranged sequentially on a disk of a disk drive, each storage band comprising a plurality of storage blocks;
    storing at least one data file that is formed from a plurality of sequential data blocks in a set of storage bands so that each data block of the data file is stored in a sequential manner with respect to consecutively sequential data blocks; and
    accessing the data blocks of the data file in their sequential order.

14. The method according to claim 13, wherein accessing the data blocks comprises:
    moving a disk head of the disk drive sequentially across the set of the plurality of storage bands; and
    reading each respective data block of the data file in sequence.

15. The method according to claim 13, wherein each storage block comprises a same size as a data block.

16. The method according to claim 13, wherein a plurality of storage blocks comprises a same size as a data block.

17. The method according to claim 13, wherein each storage band comprises at least one track, and
    wherein each track comprises at least one storage block.

18. The method according to claim 17, wherein each track comprises one storage block.

19. The method according to claim 13, wherein the data file comprises media content.

20. The method according to claim 13, wherein the data file contains data that are accessed substantially sequentially.

21. A device comprising at least one disk having at least set of a plurality of storage bands that are arranged sequentially on the disk, each storage band comprising at least one track, each track comprising at least one storage block, at least one data file that is formed from a plurality of sequential data blocks being stored in a set of storage bands so that each data block of the data file is stored in a sequential manner with respect to consecutively sequential data blocks.

22. The device according to claim 21, wherein the plurality of storage blocks comprising each storage band are sequentially arranged in the storage band, and wherein the storage blocks comprising in each storage band sequentially store data blocks of the data file.

23. The device according to claim 21, wherein each data block is stored in a storage band that is adjacent to a storage band that stores a consecutively sequential data block of the file.

24. The device according to claim 21, wherein the sequential arrangement of the storage bands of the set of storage bands is between a first and a last storage band, wherein data blocks of the data file are stored sequentially across the storage bands of the set of storage bands with a data block of the data file being stored in a storage band that is adjacent to a storage band that stores a consecutively sequential data block when the storage band is not one of the first and last storage bands and with two consecutive data blocks of the data file being stored in a storage band when the storage band is one of the first and last storage bands.

25. The device according to claim 21, wherein the sequential arrangement of the storage bands of the set of storage bands is between a first and a last storage band, wherein data blocks of the data file are stored sequentially across the storage bands of the set of storage bands with a data block of the data file being stored in a storage band that is adjacent to a storage band that stores a consecutively sequential data block.

26. The device according to claim 21, wherein the data file comprises media content.

* * * * *